(12) United States Patent
Bartsch

(10) Patent No.: US 6,707,590 B1
(45) Date of Patent: Mar. 16, 2004

(54) CONTROL METHOD FOR ELECTROCHROMIC GLAZING

(75) Inventor: Ingo Bartsch, Gelsenkirchen (DE)

(73) Assignee: Flabeg GmbH, Fuerth (DE)

( * ) Notice: Subject to any disclaimer, the term of this patent is extended or adjusted under 35 U.S.C. 154(b) by 0 days.

(21) Appl. No.: 10/030,341

(22) PCT Filed: Apr. 26, 2000

(86) PCT No.: PCT/DE00/01311

§ 371 (c)(1),
(2), (4) Date: Mar. 18, 2002

(87) PCT Pub. No.: WO00/67070

PCT Pub. Date: Nov. 9, 2000

(30) Foreign Application Priority Data

Apr. 29, 1999 (DE) .......................... 199 19 750

(51) Int. Cl.$^7$ .............................. G02F 1/15; G09G 3/38
(52) U.S. Cl. ......................................... 359/265; 345/105
(58) Field of Search ................................. 359/265–275; 345/105

(56) References Cited

U.S. PATENT DOCUMENTS

| | | | | |
|---|---|---|---|---|
| 4,832,468 A | | 5/1989 | Ito et al. | |
| 5,231,531 A | * | 7/1993 | Defendini et al. | 359/275 |
| 5,397,888 A | | 3/1995 | Muramatsu | |
| 5,694,144 A | * | 12/1997 | Lefrou et al. | 345/105 |
| 5,822,107 A | * | 10/1998 | Lefrou et al. | 359/273 |
| 5,973,818 A | * | 10/1999 | Sjursen et al. | 359/265 |
| 5,973,819 A | * | 10/1999 | Pletcher et al. | 359/265 |
| 5,978,126 A | * | 11/1999 | Sjursen | 359/265 |
| 6,020,987 A | * | 2/2000 | Baumann et al. | 359/273 |
| 6,089,721 A | * | 7/2000 | Schierbeek | 359/267 |
| 6,297,900 B1 | * | 10/2001 | Tulloch et al. | 359/275 |
| 6,362,806 B1 | * | 3/2002 | Reichmann et al. | 359/265 |
| 6,535,126 B2 | * | 3/2003 | Lin et al. | 359/269 |
| 2002/0030891 A1 | * | 3/2002 | Schierbeek | 359/265 |

FOREIGN PATENT DOCUMENTS

| | | |
|---|---|---|
| DE | 19706918 A1 | 8/1998 |
| JP | 02176728 A | 7/1990 |

* cited by examiner

*Primary Examiner*—Evelyn Lester
(74) *Attorney, Agent, or Firm*—Marshall & Melhorn, LLC

(57) ABSTRACT

A method for controlling the change in color of several sheets of an electrochromic glazing. This color change of the individual sheets within a color-change interval is controlled by individual control units, driven by a central control unit. To achieve a uniform change in color over all the electrochromic glazing sheets, the color-change interval is subdivided into a number of subintervals, whose duration is selected such that the difference in the degree of light transmission between individual electrochromic glazing sheets remains negligible. The individual control units control the change in color of the electrochromic glazing sheets progressively, using the subintervals, whereby the central control unit only begins to change the color of the electrochromic glazing sheets using a new subinterval, once all the glazing sheets which are in perfect working order have completed the change in color that has been performed during the previous subinterval.

7 Claims, 1 Drawing Sheet

CONTROL METHOD FOR ELECTROCHROMIC GLAZING

BACKGROUND OF THE INVENTION

1. Field of the Invention

The invention concerns a process of controlling the color-change process of several electrochromic glazings, where the color change of each individual electrochromic glazing is controlled within the color-change interval between an initial value $T_{start}$ and a final value $T_{end}$ by an individual control unit and where the individual control units are activated by a central monitor unit.

Electrochromic glazings are increasingly being used where variable solar control or variable light transmission is desired. Various constructions are used for electrochromic glazings. Usually, electrochromic glazings comprise electrochromic elements with a tungsten-oxide-base electrochromic layer. Such electrochromic elements in particular have proved suitable for large-area glazings where, in addition to the electrode layers necessary for application of electric voltage, as counterpart to the tungsten oxide layer, a transparent oxidic counter-electrode layer acting as ion storage layer and a polymer electrolyte layer arranged between the two are present.

The light transmission of electrochromic glazings is usually varied by the application of a voltage to the electrode layers or by impressing a current. Here, on the one hand the endeavor is to cause the color-change process to take place as rapidly as possible, where it is fundamentally desirable to operate with voltages or currents which are as high as possible. On the other hand, it is necessary to ensure that the electrochromic element of the electrochromic glazing is not permanently damaged by excessive voltages or by the flow of excessively high currents. It is necessary to take into account that the permissible voltages or currents are dependent inter alia on the area and the temperature of the electrochromic glazing. This temperature dependence is especially pronounced in the case of electrochromic elements with polymer electrolyte layers.

2. Discussion of Related Art

From WO 98/37453, a self-calibrating control process for electrochromic elements is known where an electrochromic element is assigned a control unit which regulates the voltage applied to the electrochromic element for a color change as a function of the temperature, of the current flowing and of a series of specified parameters independent of format. The previously known control process serves primarily to set the extreme states "fully colored" or "fully bleached". It also permits however the setting of intermediate states. The electrochromic element activated in this way can, with the aid of a control unit assigned to it, be set individually to any desired transmission state between the extreme states.

It is known practice to activate several electrochromic glazings with the aid of a central monitor unit and in this way to initiate a color change process simultaneously in several such glazings. It has been found that, on account of differing temperature and differing sizes of the individual glazings, significant differences can occur in the color change velocity of the individual glazings, which leads to the light transmission values of the individual glazings occasionally differing significantly from one another during the color-change process. This leads to an inhomogeneous appearance of the glazings, which is generally undesirable.

The invention is based on the technical problem of improving known control processes such that it permits a largely uniform color change of all simultaneously color-changed electrochromic glazings, without of course excessively prolonging the duration of the color-changing process.

The solution to this problem is the subject of claim 1. Advantageous developments will be found in the Subclaims.

SUMMARY OF THE INVENTION

According to the invention, the color-change interval is subdivided into a plurality of subintervals. The color change of the electrochromic glazings takes place step-by-step over these sub-intervals controlled by the individual control units; the central monitor unit does not initiate color change of the electrochromic glazings over a new subinterval until all satisfactorily operating glazings have completed their color change over the preceding subinterval.

Of course, the sizes of the subintervals should be so small that any light transmission differences between individual electrochromic glazings are not visible to the normal observer during color change over a subinterval. It has been found that this can be reliably guaranteed for example with tungsten-oxide-based electrochromic glazings if the size of the subintervals is chosen such that the light transmission factors of the individual glazings during color change over this subinterval differ from one another by a maximum of 5%, preferably at most 3%. The subintervals should not be too small, as on the one hand with decreasing size of the subintervals, measuring errors will increasingly impair the control accuracy of the individual electrochromic glazings, and on the other hand the complexity of control and monitoring as a whole will increase. It has been found that a value of approximately 2% for the variation of the light transmission factor of the electrochromic glazings within a subinterval represents the lower limit which, for the reasons stated, should not normally be undershot.

Observance of the aforementioned maximum deviation of the light transmission factor of individual glazings from that of the other glazings during a subinterval of a color change process can be guaranteed, irrespective of the dimensions and of other variables determining the rate of color change, by the size of the subintervals being chosen such that the light transmission factor of the electrochromic glazings during color change does not vary over each subinterval by more than this maximum permissible light transmission factor difference (which, as already stated, is from experience approximately 5%). It is also possible however, with a known installation situation and with known staggering of size of the glazings whose color is to be changed simultaneously, for the subintervals to be greater, as long as it is ensured that in any case under normal circumstances the light transmission factor of the individual glazings does not deviate at any time by more than 5% from that of the other glazings. In this connection, it has of course to be taken into account that even the glazing changing color slowest, at the time when the glazing changing color fastest has already completed a subinterval, has also covered at least part of the subinterval, so that the actual light transmission factor difference between all glazings involved in combined color change is, at all times during the color change over a subinterval, less than the difference of the light transmission factor of the electrochromic glazings at the beginning and at the end of the subinterval concerned.

The invention is also of course applicable with suitable adaptation to arrangements where the central monitor unit imparts to the control units light transmission values which are not nominal ones, but are different manipulated variables characterizing the state of tinting, for example "100" for "fully colored" or "0" for "fully bleached". In these cases as well, the subintervals are to be set according to the invention such that the differences in light transmission factor of the individual glazings remain imperceptible at any time, and in particular do not exceed approximately 5%.

The percentages for the subintervals are of course to be regarded as percentage points, not as relative values. Thus, according to the invention, with a color change from a light transmission factor of 50% to a light transmission factor of 20% and with a specified subinterval value of 5%, a color change will initially take place step-by-step to a light transmission factor of 45%, then to 40%, and so on down to 25% and finally to 20%. In this context the stated values for the light transmission factor are nominal desired values for control of the electrochromic glazings, not necessarily genuine measured light transmission values. Of course, the actual values of the light transmission factor of the electrochromic glazings may deviate slightly therefrom, in particular if the light transmission factor of the individual glazings cannot be measured directly, but is derived indirectly from other measured variables.

It is possible according to the invention to provide for the color-change interval to be subdivided into several subintervals of equal magnitude. Another preferred process provides for at least one subinterval at commencement of a color-change process from bleached to colored to be set smaller than the subsequent intervals. In this way, it is possible to ensure that in the region of high light transmission, in which the human eye is especially sensitive and in which in the case of tungsten-oxide-base operating electrochromic elements a clearly discernible color change takes place, only especially slight deviations in the light transmission factor of the individual glazings are permitted. Then, it is possible to proceed such that, starting from the fully bleached state of the electrochromic glazing, the first two subintervals are assigned a value of 2%, while for the subsequent subintervals a value of 4% is specified.

It is not necessary to provide any special explanation that subdivision of the color-change interval into several subintervals is in fact omitted when only a minor color change of the electrochromic glazings is desired, so that the color-change interval does not exceed the value of the subintervals specified according to the invention.

The control process according to the invention permits simultaneous color change of several electrochromic glass panes with the aid of a central monitor unit irrespective of the type of electrochromic elements used for the electrochromic glazings. The central monitor unit only specifies the intermediate color-change states to be set in each case between $T_{start}$ and $T_{end}$ and monitors the color-change process by evaluation of the status indications of the individual control units, without their having to be supplied with information concerning the type, size, temperature or other properties of the individual electrochromic glazings. The central monitor unit can for example be operated manually by a user specifying the final value $T_{end}$ by means of a keyboard or the like and initiating a color-change process. The invention is however especially suitable for integration of the electrochromic glazings in an energy management system of a building, where a plurality of electrically controllable devices are activated and monitored by a building control center. The modular design of the invention facilitates this integration.

In practice, activation of the individual glazings is preferably to take place such that the values for $T_{end}$ specified by the central monitor unit and the subintervals to be covered in each case are converted by the individual control units into quantities of charge. In the process, different switch-off criteria can basically be used. A subinterval can for example be evaluated as completed when the quantity of charge previously calculated for this subinterval has flowed. It is also possible to provide for a subinterval being completed when the current flowing through the electrochromic element falls below a specified lower threshold value. Corresponding processes are disclosed for example in WO 98/37453. Other known control processes impress a specified current on the electrochromic element and evaluate the resultant voltage for a switch-off criterion. It is also possible to evaluate several of these switch-off criteria in parallel. It is also possible, according to the coloring state of an electrochromic glazing (fully colored, fully bleached or intermediate state), to apply various switch-off criteria. The control units are either self-calibrating (WO 98/37453) or are supplied with the necessary criteria prior to their use, which permit rapid, reliable color-change of the glazing to be activated by it (for example EP 0 718 667). For reliable color change of electrochromic glazings, suitable control processes are known to the specialist and require no detailed explanation here.

Mostly, the control units will monitor, in addition to the aforementioned switch-off criteria, additional safety criteria with which malfunctions, such as for example short-circuit or wire breaks in the system, overshoot or undershoot of the permissible temperatures of the glazings and of the control units, etc., can be detected. If such a malfunction is detected, the control unit sends a corresponding status indication to the central monitor unit, whereupon the latter assesses the corresponding glazing unit as defective and, according to the nature of the fault, removes it from the scanning routine of the central monitor unit either only for the current subinterval and, if necessary, one or more of the subsequent subintervals or until remedy of the fault and until restart of the system by the user.

In order to prevent the color-change process halting or being retarded on account of an atypical malfunction in a glazing or its control unit, which has been not been recognized as a fault by the control unit or the central monitor unit, provision is made according to a special embodiment of the invention for an individual electrochromic glazing to be classified as not operating satisfactorily from the time at which an upper time limit previously stipulated for the subinterval for this glazing is reached. The central monitor unit removes this electrochromic glazing assessed as being defective from the scanning routine, at least for the current subinterval, and continues the color change over the subsequent subinterval as soon as all other satisfactory glazings have completed color change over the current subinterval. The upper time limits will normally be calculated individually at commencement of a subinterval for each glazing to undergo color change as a function of the coloring state, of the area of the glazing or of the quantity of charge necessary for the subinterval and of the temperature by means of suitable approximation formulae. Alternatively it is also possible to use tables in which are recorded numerical values for the upper time limits applicable in each case to all conceivable states of an electrochromic glazing. The upper time limits should incorporate a sufficient interval from each period of time which can be estimated mathematically for the normally occurring color change for the subinterval for the glazing in question, so that this fault criterion is only applicable in exceptional cases.

The control process according to the invention is comparatively free from faults and to a very large extent prevents the malfunction of individual electrochromic glazings or of the control units assigned to them impairing the color-change process of the other glazings.

BRIEF DESCRIPTION OF THE DRAWINGS

The invention is explained below with the aid of a block diagram.

The single FIGURE shows several electrochromic glazings 2 with the control units 4 assigned to them. The control units 4 are connected to their electrochromic glazings 2 via control and supply leads 6, by means of which the measurement and control signals can be exchanged and by means of which a voltage effecting a color-change process can be applied to the electrochromic glazings 2. The level of the voltage applied or the intensity of an impressed current can be regulated in various ways. Within the scope of the invention, operation is preferably in accordance with the teaching of WO 98/37453 for activation of the individual electrochromic glazings; this permits an especially safe color change and thus long service life of electrochromic elements. Reference to the teaching of this publication is expressly made in order to avoid repetition.

DESCRIPTION OF THE PREFERRED EMBODIMENT

Figure 1:
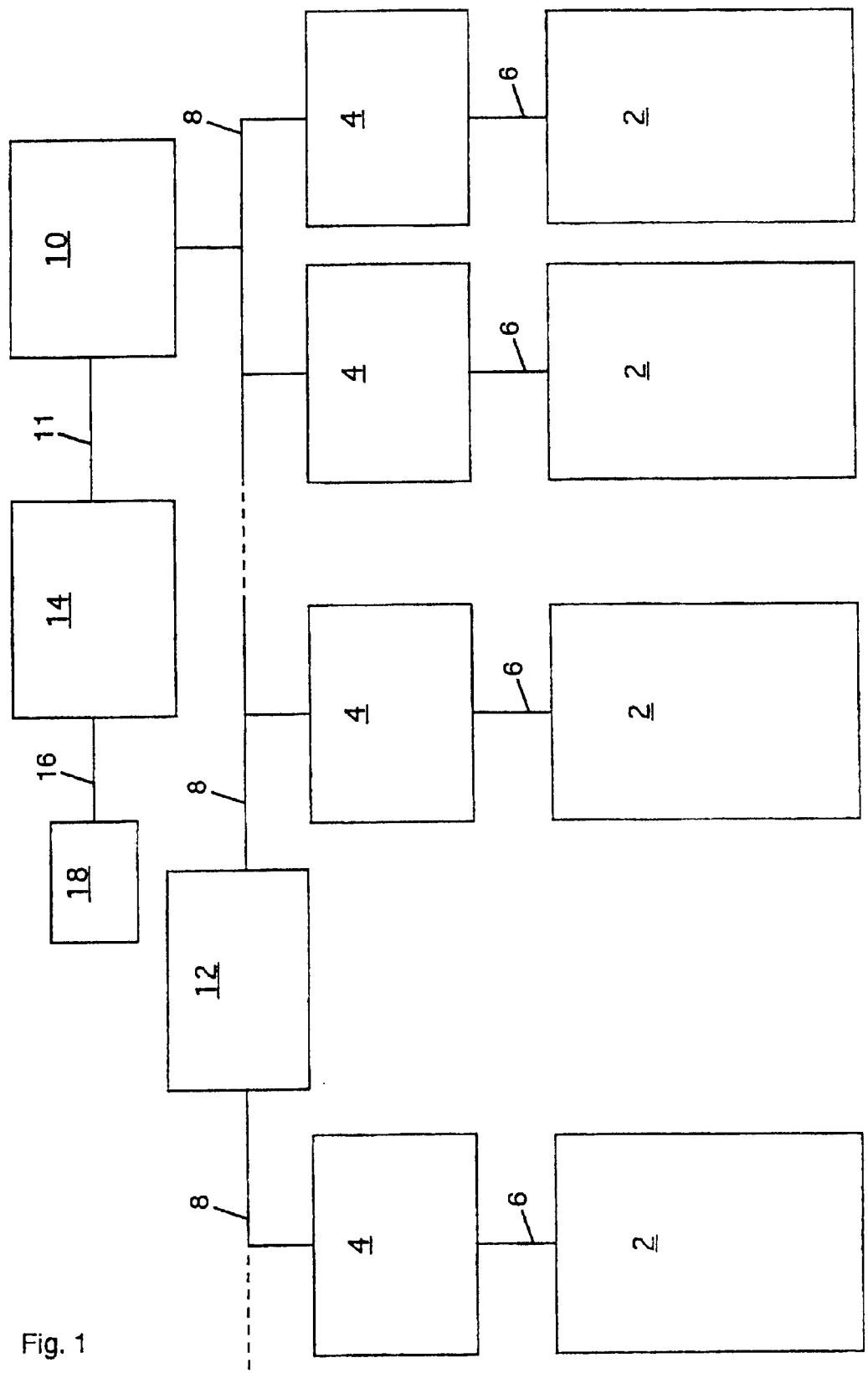

The control units 4 are for example connected via a power cable (not illustrated) to the building power supply (for example 230 V AC). They comprise typically a power supply unit (AC/DC converter), a variable current/voltage source for actuation of the electrochromic glazings 2, a computing unit for calculation of control parameters, measuring devices for variables, such as current, voltage and/or time, signal generators for transmission of status indications, etc. In order to minimize line losses which would reduce the accuracy of control of the electrochromic glazings 2, the control units 4 are designed in preference as single devices arranged in the immediate vicinity of the glazing 2 controlled by them. It lies within the scope of the invention however to combine several control units 4 in a common control device if the glazings 2 are only at a limited physical distance from one another, so that the control and supply leads 6 can remain short. The control and supply leads 6 are usually of at least four-conductor design, so that in each case at least two conductors are available for control signal and/or measured value transfer, and for the supply voltage to be applied to the glazings 2.

The individual control units 4 are connected via a bus 8 to one another and to a central monitor unit 10. They could be connected via separate single lines individually and directly in star form to the central monitor unit 10, which would however increase the cost of wiring.

The central monitor unit 10 initiates and monitors the color-change processes of the individual electrochromic glazings 2. For this purpose, it transmits via the bus 8 its control signals to the individual control units 4 and receives through it status indications of the control units 4. In the case of a large number of glazings 2 to undergo color change simultaneously or in the case of a considerable physical distance of the glazings 2 from one another or from the central monitor unit 10, it may be necessary, in order to compensate for line losses, to provide in bus 8 at a suitable point a signal amplifier (repeater) 12 with which the signals exchanged are amplified. The bus 8 can in the simplest case be a—preferably polarity-reversal-protected—two-wire line. Various methods can be used as required for signal transfer (analog, digital, various transmission protocols, etc.).

The central monitor unit 10 is, to guarantee maximum universality, preferably designed as a separate module. It is however, in particular in the case of a small number of electrochromic glazings 2 to undergo color change simultaneously, also possible to combine single or all the control units 4 and the monitor unit 10 in one device.

The central monitor unit 10 is connected via an installed standard interface, for example an RS485 interface, and a connecting lead 11 to an adapter (gateway) 14 which ensures signal transfer into a service bus system 16, for example in accordance with the LON Standard, in accordance with the EIB Standard or in accordance with any other common standard. It will thus be possible to connect the electrochromic glazings 2 to a building control center 18, through which central actuation of energy or climatic devices of a building takes place. The adapter 14 could also be part of the central monitor unit 10. It is additionally or alternatively possible to have the central monitor unit 10 operated directly by a user, for example by means of a keyboard or the like, and to dispense with integration in a service bus system. Finally, interfaces can be provided at various points of the system in order to provide connection facilities to other signal systems or to permit external intervention. The process of control according to the invention remains unchanged with all these variants.

The invention is explained with the example of color change from an initial value $T_{start}$ of 50% to a final value $T_{end}$ of 20%. The figures given each represent the nominal values for the light transmission factor of the electrochromic glazings 2. The color change process is started, either manually or via the service bus system 16, by the central monitor unit 10 being input the intended final value of color change $T_{end}$ of 20% and the color change being initiated. The central monitor unit 10 computes from the current initial value $T_{start}$ of 50% and the target value $T_{end}$ of 20% known to it, the complete color-change interval of 30% and divides this into six subintervals of 5%. The central monitor unit 10 then sends via the bus 8 a control signal to the individual control units 4, by which they are instructed to reduce the light transmission factor of the electrochromic glazing 2 connected to it by 5% to 45%.

The control units 4 compute from the specified value for the light transmission factor to be set the quantity of charge necessary for the partial color change of the corresponding glazing 2 and additionally compute an upper time limit applicable to the forthcoming subinterval, whose overshoot shall be considered as error criterion. As soon as an electrochromic glazing 2 has completed the corresponding partial color change, which is determined by the corresponding control unit 4 through evaluation of a specified switch-off criterion, the control unit 4 in question sends a corresponding status indication via bus 8 to the central monitor unit 10. If, on the other hand, the previously computed upper time limit is reached before the switch-off criterion is fulfilled, the control unit 4 sends a fault indication to the central monitor unit 10 which permits it to continue the color change process over the subsequent subinterval, when all other fault-free glazings 2 have completed their partial color change over the current subinterval. Provision can additionally be made in this case for the corresponding glazing 2 to be assessed by the central monitor unit 10 as defective and excluded permanently from the scanning routine, in order to permit fast color change on the part of the remaining glazings 2. Provision can also be made for such glazings 2 to be assessed as fault-free again and to include them in the scanning routine of the central monitor unit 10 if one of the subsequent partial color changes of this glazing 2 has been passed as satisfactory before reaching the upper time limit. To simplify the exchange of information between the central monitor unit 10 and the control units 4, provision can be made for the control units 4, on exceeding the upper time limit, to send a "partial color change completed" status indication instead of a fault indication.

As soon as all control units 4 have sent either a "fault" status indication or a "partial color change completed" status indication to the central monitor unit 10, the latter will initiate, by sending corresponding control signals to the control units 4, the subsequent partial color change over the next subinterval of 5% to an intermediate value of 40%. This process is repeated until finally the final value $T_{end}$ is reached and the color change of all electrochromic glazings 2 is completed.

During the course of a practical trial, 10 electrochromic glazings were installed adjacent to one another in a building curtain wall. The electrochromic glazings comprised electrochromic elements with two transparent electrode layers, an electrochromic tungsten oxide layer, a transparent counter-electrode layer (ion storage layer) and a polymer electrolyte layer. The electrochromic glazing with the largest area was twice the size of the smallest glazing. On account of differing solar radiation and of shading effects, the electrochromic glazings intermittently evidenced significant temperature differences. Through the use of the process according to the invention with subintervals of 5%, it was possible to achieve the effect that the individual electrochromic glazings, during a color change process between the extreme values "fully bleached" ($T_{start}$=50%) and "fully colored" ($T_{end}$=15%) did not perceptibly differ from one another in their light transmission. The appearance of the curtain wall was fully homogeneous at all times.

The features disclosed in the foregoing description, in the claims and/or in the accompanying drawing may, both separately and in any combination thereof, be material for realizing the invention in diverse forms thereof.

What is claimed is:

1. Process of controlling the color-change process of several electrochromic glazings, where the color change of each individual electrochromic glazing is controlled within the color-change interval between an initial value $T_{start}$ and a final value $T_{end}$ by an individual control unit and where the individual control units are activated by a central monitor unit, characterized in that the color-change interval is subdivided into a number of subintervals and that the color change of the electrochromic glazings takes place under the control of the individual control units step-by-step over these subintervals, where the central monitor unit only initiates the color change of the electrochromic glazings over a new subinterval when all satisfactorily operating glazings have completed color change over the preceding sub-interval.

2. A process in accordance with claim 1, wherein the size of the subintervals is chosen such that the light transmission of the individual electrochromic glazings differ from one another during color change over this subinterval by a maximum of 5%.

3. A process according to claim 1, wherein the size of the subintervals is chosen such that the light transmission of the electrochromic glazings varies within this subinterval by at least 2%.

4. A process according to claim 1, wherein the color-change interval is subdivided into subintervals of the same size.

5. A process according to claim 1, wherein at least one subinterval at the beginning of a color change from bleached to colored is set smaller than the subsequent subintervals.

6. A process according to claim 1, wherein an individual electrochromic glazing is assessed as not operating satisfactorily as soon as an upper time limit previously specified for the subinterval in question for this glazing is reached.

7. A process according to claim 1, wherein the size of the subintervals is chosen such that the light transmission of the individual electrochromic glazings differ from one another during color change over this subinterval by a maximum of 3%.

* * * * *